United States Patent [19]
Lubowitz et al.

[11] Patent Number: 5,780,583
[45] Date of Patent: Jul. 14, 1998

[54] REACTIVE POLYARYLENE SULFIDE OLIGOMERS

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 639,051

[22] Filed: Jan. 9, 1991

[51] Int. Cl.$^6$ .............................. C08G 75/14; B32B 27/06
[52] U.S. Cl. ............... 528/388; 252/183.11; 252/183.13; 428/419; 442/128; 442/134
[58] Field of Search ................ 252/183.11, 183.13; 528/388; 428/265, 272, 419

[56] References Cited

U.S. PATENT DOCUMENTS

| | | | |
|---|---|---|---|
| 3,354,129 | 11/1967 | Edmonds . | |
| 3,458,486 | 7/1969 | Ray et al. | 528/388 X |
| 3,770,697 | 11/1973 | Holub et al. . | |
| 3,787,363 | 1/1974 | Staniland et al. . | |
| 3,879,349 | 4/1975 | Bilow et al. | 528/127 |
| 3,919,177 | 11/1975 | Campbell | 528/373 |
| 4,038,261 | 7/1977 | Crouch et al. | 528/388 |
| 4,100,138 | 7/1978 | Bilow et al. | 526/262 |
| 4,107,125 | 8/1978 | Lovejoy | 523/307 |
| 4,108,837 | 8/1978 | Johnson et al. | 528/126 |
| 4,108,926 | 8/1978 | Arnold et al. | 525/534 |
| 4,293,670 | 10/1981 | Robeson et al. | 525/436 |
| 4,297,474 | 10/1981 | Williams, III et al. | 528/170 |
| 4,298,720 | 11/1981 | Yamazaki et al. | 526/262 |
| 4,414,269 | 11/1983 | Lubowitz et al. | 428/290 |
| 4,438,280 | 3/1984 | Monacelli | 562/457 |
| 4,465,809 | 8/1984 | Smith | 525/284 |
| 4,476,184 | 10/1984 | Lubowitz et al. | 428/288 |
| 4,482,683 | 11/1984 | Quella et al. | 528/388 X |
| 4,535,117 | 8/1985 | Mathis et al. | 524/397 |
| 4,536,559 | 8/1985 | Lubowitz et al. | 528/170 |
| 4,649,080 | 3/1987 | Fischer et al. | 428/419 |
| 4,654,410 | 3/1987 | Kashiwame et al. | 528/171 |
| 4,680,326 | 7/1987 | Leland et al. | 524/106 |
| 4,690,972 | 9/1987 | Johnson et al. | 524/609 |
| 4,699,975 | 10/1987 | Katto et al. | 528/388 X |
| 4,703,081 | 10/1987 | Blackwell | 524/592 |
| 4,708,983 | 11/1987 | Liang | 525/101 |
| 4,716,212 | 12/1987 | Gaughan | 528/226 |
| 4,769,424 | 9/1988 | Takekoshi et al. | 525/435 |
| 4,769,426 | 9/1988 | Iwasaki et al. | 525/537 |
| 4,774,282 | 9/1988 | Qureshi | 524/606 |
| 4,786,713 | 11/1988 | Rule et al. | 528/389 |
| 4,798,686 | 1/1989 | Hocker et al. | 252/500 |
| 4,806,407 | 2/1989 | Skinner | 428/224 |
| 4,837,256 | 6/1989 | Gardner et al. | 524/141 |
| 4,851,501 | 7/1989 | Lubowitz et al. | 528/170 |
| 4,871,475 | 10/1989 | Lubowitz et al. | 252/300 |
| 4,895,892 | 1/1990 | Satake et al. | 524/520 |
| 4,895,924 | 1/1990 | Satake et al. | 528/226 |
| 5,066,776 | 11/1991 | Rüsseler et al. | 528/388 |

FOREIGN PATENT DOCUMENTS

| | | | |
|---|---|---|---|
| 0266662 | 5/1988 | European Pat. Off. | 528/388 |

*Primary Examiner*—Richard D. Lovering
*Attorney, Agent, or Firm*—Senniger, Powers, Leavitt & ROedel

[57] ABSTRACT

Crosslinkable poly(arylene sulfide) oligomers are prepared by reaction of a dihaloaromatic compound, a sulfur compound that is reactive with halo organic compounds to form thioethers, and an end cap monomer corresponding to the formula:

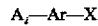

$$A_i-Ar-X$$

where A is an alpha, beta-unsaturated hydrocarbon moiety that is subject to step growth reaction by chemical activation, or by thermal activation at temperatures substantially in excess of the temperature of formation of the oligomer. Both linear and multidimensional oligomers are disclosed.

41 Claims, No Drawings

REACTIVE POLYARYLENE SULFIDE OLIGOMERS

TECHNICAL FIELD

This invention relates to linear and multidimensional poly(arylene sulfide) oligomers, chain terminated by one or two chemically crosslinking functional groups, methods for the preparation of such oligomers, and blends of such oligomers with macromolecular and oligomeric polymers. The oligomers are crosslinked with thermal and/or chemical activation to form high molecular weight polymers that are thermally and mechanically stable at elevated temperatures. Prepregs comprising these oligomers and fibrous materials are used in the preparation of composites suitable for high performance applications, particularly advancing cost-effectively the mechanical and electrical performance of structures.

BACKGROUND ART

Although thermoplastic resins are well known, the use of fiber-reinforced thermoplastic resins is a relatively new art. Fiber toughens and stiffens the thermoplastic resin to produce high-performance composite products. A sheet of fiber-reinforced resin can be heated and then stamped into a desired shape with appropriate dies. The shape can be altered thereafter, if desired.

Thermoplastic resins commonly have a tendency to be weakened by organic solvents. Accordingly, circuit boards formed from conventional, fiber-reinforced thermoplastic resin composites usually cannot be cleaned with solvents that are commonly used in the aerospace industry. In structural aircraft applications, care must also be taken to eliminate contact between the composites and hydraulic or cleaning fluids. At moderate or high temperatures, many fiber-reinforced thermoplastic composites lose their abilities to carry load due to softening of the resin. When under mechanical load, thermoplastics lose their dimensional stability due to creep. Thus, improved thermal and mechanical stability and solvent-resistance are desirable to fulfill the existing needs for advanced composites. Although crystallinity may alleviate some shortcomings of thermoplastics, the anisotropic nature of their molecular state makes the resultant compositions sensitive to processing.

Recently, chemists have sought to synthesize chemically thermosetting oligomers for high performance advanced composites suitable for aerospace applications. These composites should preferably exhibit solvent resistance, toughness, impact and creep resistance, ease of processing, and strength, and some thermoplasticity. Oligomers and composites that have thermooxidative and dimensional stability and, accordingly, can be used at elevated temperatures are particularly desirable. While the most prevalently employed materials, epoxy-based composites, are suitable for many applications, nevertheless, their brittle nature and susceptibility to degradation make them inadequate for many aerospace applications, especially those applications which require thermally stable, tough composites.

Accordingly, research has recently focused on polyimide composites to achieve an acceptable balance between thermal stability, solvent resistance, and toughness.

But, to be suitable for use in the preparation of high performance composite materials, polymeric matrix materials must meet a variety of properties, some of which are not evident in polyimides. Materials which provide the maximum in thermo-oxidative properties do not always meet processibility requirements for reliable and cost-effective manufacture of composite materials. While polyimides have been developed which satisfy many processing criteria, a need exists for materials having yet enhanced processing characteristics, as well as high performance properties. In order to enhance processability and realize high performing composites, Boeing has introduced to the art thermosetting oligomers, such as thermosetting aromatic polyimides and other aromatic oligomers with various chain extending monomers. Such monomers have included, for example, polyaryl moieties linked through flexibilizing linkages such as sulfone, ether, sulfide, carbonyl, or isopropylidene groups.

Lubowitz U.S. Pat. No. 4,476,184 discloses thermally stable polysulfone compositions prepared by reacting two moles of an imidophenol end cap monomer corresponding to the formula:

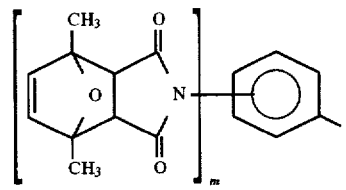

where m is 1 or 2, n+1 moles of a dihalo polyaryl compound and n moles of an polyaryl diol containing sulfone linkages. Either the dihalo compound, the diol, or both may contain a diaryl radical in which the aryl rings are connected by a sulfone linkage. Alternatively, the disclosure contemplates the use of 4,4'-dichlorodiphenylthioether and/or 4,4'-dihydroxydiphenylthioether.

Lubowitz et al. U.S. Pat. No. 4,414,269 describes a crosslinkable polysulfone or polyethersulfone formed by reacting 2 moles of a nadimidophenol, maleimidophenol or ethynylphthalimidophenol with n+1 moles of a dihaloaromatic compound and n moles of an aromatic diol. The dihaloaromatic compound and/or the diol may contain a diphenylene sulfone or diphenylene sulfide group.

Lubowitz et al. U.S. Pat. No. 4,871,475 discloses the preparation of an oligomer by condensing 2 moles of amono- or difunctional maleimidophenol, nadimidophenol, oxynadimidophenol or ethynylphthalimidophenol with n+1 moles of a dihalogen moiety and n moles of a diol. Exemplary dihalogen compounds and diols include 4,4'-dichlorodiphenylsulfone, 4,4'-dichlorodiphenylthioether, 4,4'-dihydroxydiphenylsulfone, and 4,4'-dihydroxydiphenylthioether.

Each of the Lubowitz et al. '184, '269 an '475 contemplates the preparation of composites from the oligomer by a curing reaction which cause crosslinking between the nadic, oxynadic, ethynyl or maleic moieties.

Multidimensional oligomers, such as disclosed in our copending applications U.S. Ser. Nos. 07/000,605, now U.S. Pat. No. 5,210,213, 07/167,656, and 07/176,518, have superior processibility and can be managed at lower temperatures. Upon curing, the terminal functional groups crosslink, whereby the thermal resistance and stiffness of the resulting composite is markedly increased. This increase is obtained with only a minor loss of matrix stress transfer capabilities (impact resistance), toughness, elasticity, and other mechanical properties. Glass transition temperatures above 850° F. were achieved. Thereby high performance composites are readily prepared from easily manageable materials.

In contrast, commercial polyesters, when combined with well-known reactive diluents, such as styrene, exhibit marginal thermal and oxidative resistance, therefore not having engineering properties, and are useful only for aircraft or aerospace interiors. Polyarylesters are often unsatisfactory, also, since the resins often are semicrystalline which may make them insoluble in useable laminating solvents, intractable in fusion under typical processing conditions, and difficult and expensive to manufacture because of shrinking and/or warping. Those polyarylesters that are soluble in conventional laminating solvents remain so in composite form, thereby limiting their usefulness in structural composites. The high concentration of ester groups contributes to resin strength and tenacity, but also to make the resin susceptible to the damaging effects of water absorption. High moisture absorption by commercial polyesters in high humidity conditions can lead to lowering of the glass transition temperature leading to distortion of the composite when it is loaded at elevated temperature.

Polyesters with advanced properties can be prepared by our previous work using crosslinkable, end-capped polyester imide ether sulfone oligomers. These were found to have a favorable combination of solvent resistance, toughness, impact resistance, strength, ease of processing, formability, and thermal resistance. As described in copending U.S. Ser. No. 07/137,493, such oligomers are prepared from chain extending monomers containing flexibilizing —$SO_2$— linkages. As further disclosed, a —(C=O)—, —O—, —S—, —C($CH_3$)$_2$—, or —C($CF_3$)$_2$ linkage may be substituted for the —$SO_2$— linkage in the chain extending monomer. By including Schiff base (—CH=N—) linkages in the oligomer chain, the linear, advanced composites formed with polyester oligomers of our copending application U.S. Ser. No. 07/137,493 can have semiconductive or conductive properties when appropriately doped or reacted with appropriate metal salts. In this vein, we find significant advantages can be realized for poly(arylene sulfide) polymers, thereby upgrading cost effective resins to produce higher performance composites.

Edmonds U.S. Pat. No. 3,354,129 describes the preparation of poly(arylene sulfide) polymers by the reaction of an alkali metal sulfide with a polyhalo-substituted aromatic (preferably dihaloaromatic) compound wherein the halogen atoms are attached to ring carbon atoms in a polar organic compound at elevated temperature. A copper compound, such as cuprous and cupric sulfides, halides and the like may be present to aid in the formation of the polymer. Molecular weight of the polymer is increased by heat treatment, either in the absence of oxygen or with an oxidizing agent. Molecular weight is said to be increased due to crosslinking, lengthening of the polymer chain, or both.

Campbell U.S. Pat. No. 3,919,177 discloses the preparation of p-phenylene sulfide polymers by reacting p-dihalobenzene, a suitable source of sulfur, an alkali metal carboxylate, and a preferably liquid organic amide. Both of the latter two components serve as polymerization aids. The alkali metal carboxylate may typically be lithium acetate, lithium propionate, sodium acetate, potassium acetate or the like. The organic amide may typically be formamide, acetamide, N-methylformamide, N-methyl-2-pyrrolidone, etc. A variety of sulfur sources are listed, including alkali metal sulfides, thiosulfates, thiourea, thioamides, elemental sulfur, carbon disulfide, carbon oxysulfide, thiocarbamates, thiocarbonates, mercaptans mercaptides, organic sulfides, and phosphorus pentasulfide.

Crouch et al U.S. Pat. No. 4,038,261 describes a process for the preparation of poly(arylene sulfide)s by contacting p-dihalobenzene, a polyhalo aromatic compound having greater than two halogen substituents, an alkali metal sulfide, lithium carboxylate or LiCl, N-methyl pyrrolidone, and an alkali metal hydroxide. The use of a polyhalo compound results in the formation of a branched chain polymer of reduced melt flow that can be spun into fibers. The alkali metal sulfide can be charged to the reaction in hydrated form or as an aqueous mixture with an alkali metal hydroxide.

Gaughan U.S. Pat. No. 4,716,212 describes the preparation of poly(arylene sulfide ketone)s by reaction of a polyhalobenzophenone such as 4,4'dichlorobenzophenone and a mixture of sodium hydrosulfide and sodium hydroxide.

Satake et al U.S. Pat. Nos. 4,895,892 and 4,895,924 both disclose melt stable poly(arylene thioether ketone)s. The '892 patent describes blends of an arylene thioether ketone polymer with a thermoplastic resin such as poly(arylene thioether)s, aromatic polyether ketones, polyamides, polyamideimides, polyesters, polyether sulfones, polyether imides, poly(phenelyene ether)s, polycarbonates, polyacetals, fluoropolymers, polyolefins, polystyrene, polymethyl methacrylate, ABS, and elastomers such as fluororubbers, silicone rubbers, polyisobutylenes, hydrogenated SBR, polyamide elastomers and polyester elastomers. The '924 patent discloses the preparation of poly(arylene thioetherketone) fibers by melt spinning of polymers and blends of the type disclosed in '892.

Blackwell U.S. Pat. No. 4,703,081 describes a ternary polymer alloy comprising a poly(arylene sulfide), a poly (amide imide) and a poly(aryl sulfone). The poly(arylene sulfide) is prepared, for example, by reaction of p-dichlorobenzene and sodium sulfide in the presence of N-methyl pyrrolidone. Various other di- and tri- halo aromatics are mentioned as monomers for use in the preparation of the poly(arylene sulfide)s.

Johnson et al U.S. Pat. No. 4,690,972 describes the preparation of poly(arylene sulfide) compositions by incorporating additives which affect the crystalline morphology, followed by heating and cooling steps. Among the preferred arylene sulfides are poly(phenylene sulfide) and poly (phenylene sulfide ketone). The additive is preferably a poly(arylene ether ketone) such as 1,4-oxyphenoxy-p,p'-benzophenone.

Leland et al U.S. Pat. No. 4,680,326 describes poly (arylene sulfide) compositions having a combination of good cracking resistance and electrical insulation resistance. The compositions include a reinforcing material, polyethylene, and an organosilane.

Skinner U.S. Pat. No. 4,806,407 describes blends of p-phenylene sulfide polymers and melt extrudable polymers such as non-halogenated polymers and copolymers of olefins, halogenated homopolymers (polyvinylidene fluoride, polyvinyl chloride, polychlorotrifluoroethylene and the like), ethylene/acrylic copolymers (e.g., Surlyn), and both aromatic and aliphatic polyamides.

SUMMARY OF THE INVENTION

Among the several objects of the present invention may be noted the provision of oligomers useful in the preparation of poly(arylene sulfide) polymers having favorable thermomechanical and thermooxidative properties; the provision of arylene sulfide oligomers useful in the preparation of composite materials having advantageous performance properties; the provision of arylene sulfide oligomers having favorable processing characteristics in the preparation of such composites; the provision of such oligomers which can be cured to form polymers of high solvent resistance, moisture resistance, toughness and impact resistance; the provision of blends having favorable processing characteristics; and the provision of methods for the preparation of such oligomers, polymers and composites.

Briefly therefore, the present invention is directed to a process for the preparation of a crosslinkable poly(arylene sulfide) oligomer. The process comprises reacting n equivalents of a dihaloaromatic compound, n+1 equivalents of a sulfur compound that is reactive with halo organic compounds to form thioethers, and 2 equivalents of an end cap monomer corresponding to the formula:

where:

X is halogeno;

i is 1 or 2; and

A comprises an α, β-unsaturated hydrocarbon moiety that is subject to step growth reaction by chemical activation, or by thermal activation at a temperature substantially in excess of the temperature of formation of the oligomer.

The invention is further directed to an oligomer prepared according to the above described process.

The invention is further directed to an oligomer corresponding to the formula:

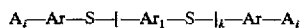

where:

Ar and $Ar_1$ are arylene;

k is an integer such that the oligomer has a molecular weight of between about 500 and about 40,000; and A and i are as defined above.

Further contemplated by the invention is a crosslinkable arylene sulfide oligomer corresponding to the formula:

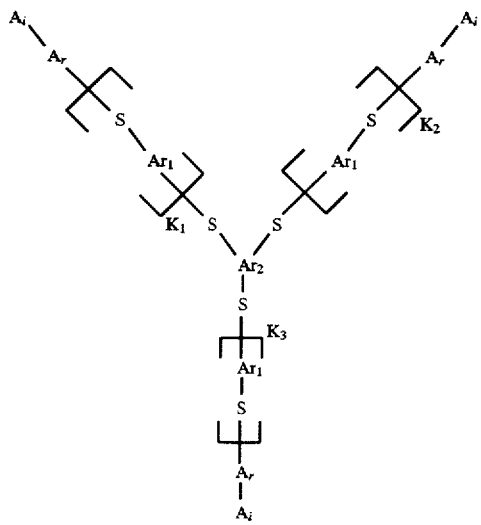

or

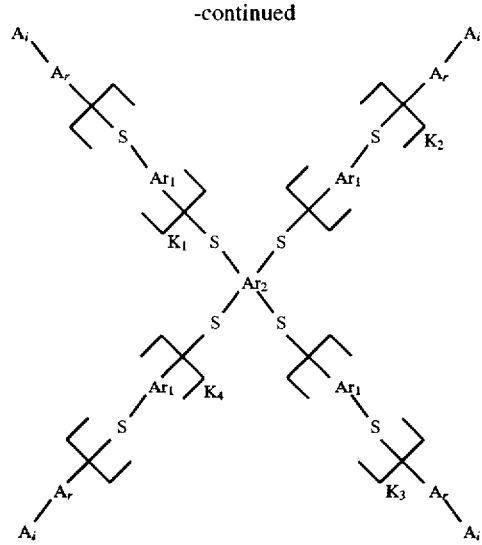

wherein:

Ar and $Ar_1$ are arylene;

$Ar_2$ is a polyvalent aromatic hub moiety;

i is 1 or 2;

A is as defined above; and $k_1$, $k_2$, $k_3$ and $k_4$ are integers whose values are such that the oligomer has a molecular weight of between about 500 and about 40,000.

Also contemplated by the invention is a process for the preparation of a crosslinkable poly(arylene sulfide) oligomer, comprising reacting n equivalents of a dihaloaromatic compound, n+1 equivalents of a sulfur compound that is reactive with halo organic compounds to produce thioethers, m equivalents of a polyhaloaromatic compound having m halo substituents that are reactive with the sulfur compound, and m equivalents of an end cap monomer corresponding to the formula:

where:

Ar is arylene;

n≧m

X is halogeno;

i is 1 or 2; and

A is as defined above.

The invention is further directed to a blend comprising an oligomer selected from among the various types defined above and another polymer compatible therewith.

Other objects and features will be in part apparent and in part pointed out hereinafter.

DESCRIPTION OF THE PREFERRED EMBODIMENTS

In accordance with the present invention, poly(arylene sulfide) oligomers are provided which may be crosslinked to produce polymers having excellent thermomechanical and themooxidative properties. The polymers exhibit a high degree of toughness, solvent resistance and moisture resistance. Polymers may be prepared from the oligomers in the form of films, coatings, moldings, fibers and other structures useful in engineering applications. Polymers produced from the oligomers of the invention exhibit exceptional toughness and impact resistance. The oligomers are particularly valuable in the preparation of composite structural materials useful in aircraft, aerospace and other high performance applications.

Constituent molecules of certain of the oligomers of the invention may fold back upon themselves and thus behave as liquid crystals. This property offers a further range of application for these novel compositions.

When used for the preparation of various forms of polymer products, the oligomers of the invention exhibit especially favorable processing characteristics. Their melt and plastic flow properties are especially advantageous for the preparation of moldings and composites without the necessity of solvents. Because the oligomers crosslink by an addition or "step growth" mechanism, curing of moldings or composites can be conducted without outgassing of condensation products, thereby yielding polymer products of exceptional structural and dimensional integrity. Adhesives comprising the oligomers of the invention, and the polymeric products obtained by curing thereof, can also be prepared without outgassing of either reaction products or solvents.

The oligomers are crosslinkable by addition or step growth reaction of the unsaturated moieties of the end caps. In this respect they differ from the polymers of U.S. Pat. No. 3,354,129, which are crosslinked through functional groups provided in the linear backbone, and from the polymers of U.S. Pat. No. 4,038,261, in which linear chains are branched and crosslinked by incorporation of a minor proportion of trihaloaromatic compound in a polymerization mixture comprising p-dihalobenzene and sulfur compound.

Oligomers of the invention are prepared in both linear and multidimensional form. The linear oligomers are prepared by reacting n equivalents of a dihaloaromatic compound, n+1 equivalents of a sulfur compound that is reactive with halo organic compounds to form thioethers, and 2 equivalents of an end cap monomer which comprises an unsaturated moiety that is subject to an addition or step growth reaction under curing conditions. Crosslinking of the oligomer may subsequently take place by such reaction.

Generally, the sulfur compound used in the preparation of the oligomer is characterized by its reactivity with halo organic compounds to produce thioethers. Preferably, the sulfur compound comprises an alkali metal sulfide, an alkali metal sulfohydride, or an alkali metal bisulfide. Among the various other sulfur compounds which may optionally be used in the reaction are alkali metal thiosulfates, thioamides, elemental sulfur, carbon disulfide, carbon oxysulfide, thiocarbamates, thiocarbonates, mercaptans, mercaptides, organic sulfides and phosphorus pentasulfide. If the sulfur compound used is other than an alkali metal sulfide or bisulfide, a base should also incorporated in the reaction charge. If the sulfur compound is an alkali metal bisulfide, the use of a base is not strictly necessary, but is preferred. If the sulfur compound is an alkali metal sulfide no base is needed.

Exemplary dihaloaromatic compounds useful in the preparation of the oligomer include:
1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
1,4-di-n-butyl-2,5-dichlorobenzene
1,4-di-n-nonyl-2,6-dibromobenzene
2,5-dichlorobenzamide
1-acetamido-2,4-dibromonaphthalene
4,4'-dichlorobiphenyl
p-chlorobromobenzene
p,p'-dichlorodiphenylether
o,p'-dibromodiphenylamine
4,4'-dichlorobenzophenone
4,4'-dichlorodiphenylsulfone The end cap monomer corresponds to the formula:

where:

X is halogeno;

i is 1 or 2; and

A comprises an α, β-unsaturated hydrocarbon moiety that is subject to step growth reaction by chemical activation, or by thermal activation at a temperature substantially in excess of the temperature of formation of the oligomer.

Thus the end cap moiety is effective for cross-linking of the oligomer, but does not undergo premature crosslinking during the course of the oligomer formation reaction.

Preferably, A comprises an imido moiety such as, for example, nadimido, allylnadimido, maleimido, or alkynylphthalimido. Particularly preferred structures of A include:

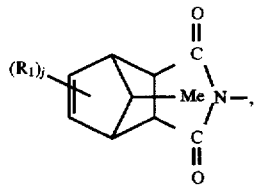

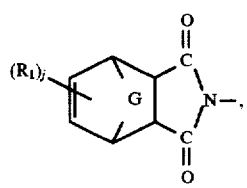

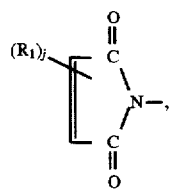

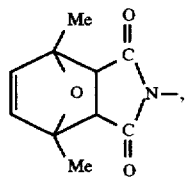

-continued

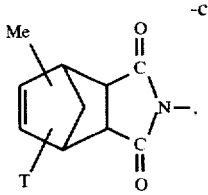

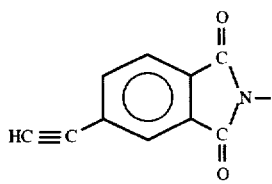

where:

Me=Methyl;

G=—O—, —SO$_2$—, —CH$_2$—, or —S—;

T=allyl or methallyl;

R$_1$=lower alkoxy, aryl, substituted aryl, lower alkyl, substituted alkyl, aryloxy, or halogen;

j=0, 1 or 2; and

Ar is arylene.

Exceptionally favorable properties may be obtained in polymers produced from difunctional oligomers, i.e., those prepared from end cap monomers in which i=2.

Preparation of the oligomer is preferably carried out in the presence of a polymerization aid such as a liquid organic amide, a carboxylic acid salt, or both. In the preparation of conventional poly(arylene sulfide) polymers, such aids are effective in increasing the average molecular weight of the polymerization product. In the process of the invention, the use of such polymerization aids is believed to be effective in controlling and limiting the molecular weight distribution within a narrow range of variability.

Conditions for carrying out the oligomerization reaction are essentially the same as those described in U.S. Pat. Nos. 3,354,129 and 3,919,177, which are expressly incorporated herein by reference. The reaction may be carried out, for example, by contacting the dihalo aromatic compound, the sulfur compound and the end cap monomer in a polar solvent at a temperature of from about 125° to about 450° C., preferably from about 175° to about 350° C. The amount of polar solvent may vary over a wide range, typically from about 100 to about 2500 ml. per mole of the sulfur compound.

Alkali metal carboxylates that may be employed in the reaction generally correspond to the formula:

R$_2$COOM where R$_2$ is a hydrocarbyl radical selected from alkyl, cycloalkyl, and aryl and combination thereof such as alkylaryl, alkylcycloalkyl, cycloalkylalkyl, arylalkyl, arylcycloalkyl, alkylarylakyl and alkylcycloalkylalkyl, the hydrocarbyl radical having 1 to about 20 carbon atoms, and M is an alkali metal selected from the group consisting of lithium, sodium, potassium, rubidium and cesium. Preferably, R$_2$ is an alkyl radical having 1 to about 6 carbon atoms or a phenyl radical and M is lithium or sodium, most preferably lithium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dipropylbutyramide, 2-pyrrolidone, N-methyl-2-pyrrolidone, ε-caprolactam, N-methyl-ε-caprolactam, hexamethylphosphoramide, tetramethylurea, and the like, and mixtures thereof.

When alkali metal carboxylates and organic amides are employed for control of the oligomer formation reaction, the reaction is preferably carried out at a temperature of between about 235° C. and about 450° C., preferably about 240° to about 350° C., with the exception that when the alkali metal carboxylate is a sodium, potassium, rubidium, or cesium salt of an aromatic carboxylic acid, i.e., an acid in which the carboxy group is attached directly to an aromatic nucleus, the temperature should be within the range of from about 255° C. to about 450° C., preferably from about 260° C. to about 350° C. The reaction time is within the range of from about 10 minutes to about 3 days and preferably about 1 hour to about 8 hours. Preferably, the alkali metal carboxylate compound is employed in a proportion within the range of from about 0.5 to about 2 moles per mole of the dihaloaromatic compound. Where N-methylpyrrolidone is utilized as the organic amide component of the reactor charge, it should be employed in a proportion within the range of about 100 to about 2500 g/ g-mole of the dihaloaromatic compound.

Generally, the oligomer produced by the above reaction corresponds to the formula:

A$_i$—Ar—S—[—Ar$_1$—S—]$_k$—Ar—A$_i$ where:

Ar and Ar$_1$ are arylene;

k is an integer; and

A and i are as defined above.

Generally, k is such that the oligomer has a molecular weight of between about 1000 and about 40,000. (When the oligomer is prepared as described above, k=2n.) Such oligomers may be used, in melt or solution form, for the preparation of films, moldings, and composites. Curing at a temperature in the range of between about 480° and about 640° F. causes step growth reaction between the unsaturated moieties of the end groups, resulting in the formation of high molecular weigh polymers having superior thermal and mechanical properties and solvent resistance. The curing reaction may be initiated either thermally or chemically. Where the oligomer has a relatively high molecular weight, for example, greater than 10,000, preferably about 15,000 to 25,000, the polymer produced on curing is thermoformable. Where the molecular weight is below 10,000, especially in the range of between about 1000 and about 6000, the cured resin is a thermoset material.

In accordance with the invention, multidimensional oligomers are also prepared and used for the preparation of arylene sulfide polymers useful in the manufacture of composite materials, moldings, coatings, films, fibers and the like. Multidimensional oligomers are prepared by reacting n equivalents of a dihaloaromatic, n+1 equivalents of a sulfur compound that is reactive with haloaromatics to form thioethers, n equivalents of a polyhalo aromatic compound having m halogen substituents, and m equivalents of an end cap monomer of the type defined above. Typically, m is either 3 or 4, so that the product has the structure:

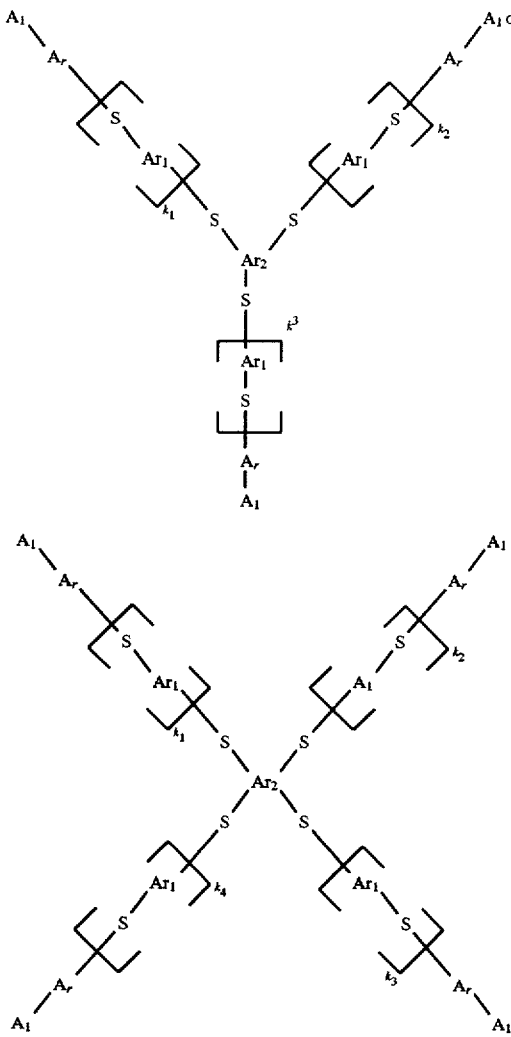

where A, i, Ar and $Ar_1$ are as defined above, $Ar_2$ is a polyvalent aromatic hub moiety, and $k_1$, $k_2$, $k_3$, and $k_4$ are such that the molecular weight of the oligomer is between about 2000 and about 40,000. In accordance with the invention, $k_1$, $k_2$, $k_3$ and $k_4$ may be equal or vary, but are preferably equal. If n is selected so that $k_1$, etc. are too large, there is a tendency for the polyhalo compound to provide sites for crosslinking of linear chains rather than to form the hubs of discrete multidimensional oligomers. Preferably, the molecular weight is in the range of 2000–6000 where the oligomer is to be used in the preparation of a thermoset polymer, and 10,000 to 40,000, most preferably 15,000–25,000, when the oligomer is to be used for preparation of a thermoformable polymer.

The steps and conditions for preparing the multidimensional oligomers from the aforesaid reactants are substantially the same as described above for the linear arylene sulfide oligomers.

In the preparation of either linear or multidimensional oligomers, it is generally preferred that the dihalo aromatic compound comprise a dihalobenzene such as, for example, p-dichlorobenzene or m-dichlorobenzene, and the sulfur compound be an alkali metal sulfide such as sodium sulfide. The latter may be prepared in situ by reaction of an alkali metal hydrosulfide and a base. An advantageous method for the preparation of arylene sulfide oligomers from an alkali metal hydrosulfide is described in U.S. Pat. No. 4,716,212, which is expressly incorporated herein by reference. This patent specifically describes the preparation of poly(arylene sulfide ketone)s from dihalo aromatic reactants such as 4,4'-dichlorobenzophenone.

Generally, preparation of the end cap monomer is initiated by reacting an anhydride corresponding to the formula:

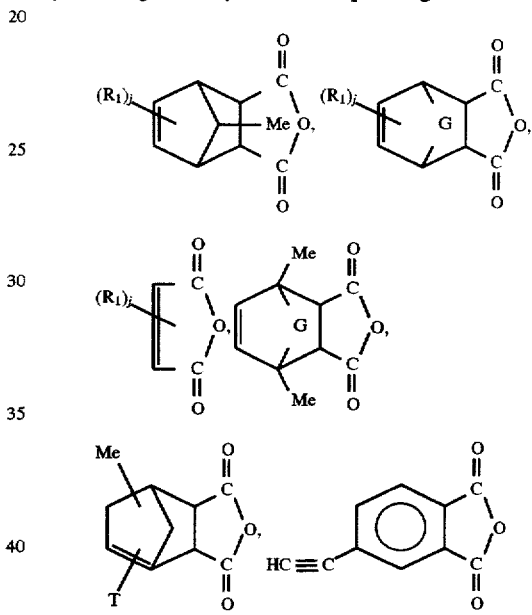

where $R_1$, j, G, Me and T are as defined above, with a mono- or diamine corresponding to the formula:

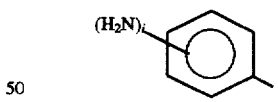

where B is —OH, —SH, or —X, and X and i are as defined above, thereby producing a compound corresponding to the formula:

where A, i, and B are as defined above. In the case where B is halogen, the product of the initial reaction is suitable for use as an end cap monomer in the preparation of the oligomers of this invention. Where B is —SH or —OH, the product of the initial reaction is condensed with a dihalo aromatic compound, typically of the type used in the subsequent formation of the oligomer. Conditions for the reaction of the anhydride with the amine or diamine are described in commonly assigned U.S. Pat. No. 4,661,604, which is expressly incorporated herein by reference. Conditions for the condensation of an imidophenol or imidothiophenol, as formed in the initial reaction, are comparable to the conditions for the instant oligomer formation reaction.

A particularly preferred end cap monomer for use in the preparation of the oligomers of the invention corresponds to the formula:

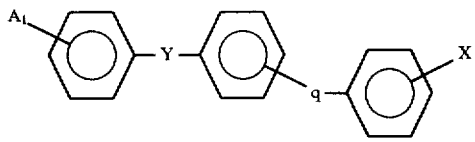

where X is halogeno, Y is —S— or —O—, and q is selected from among —O—, —(C=O)—, —SO$_2$—, —S—, —C(CH$_3$)$_2$—, —CH$_2$— and —C(CF$_3$)$_2$—. In an especially advantageous embodiment of the invention, this end cap monomer may be prepared by reaction of an end cap precursor compound corresponding to the formula:

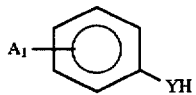

where A and i are as defined above, with an excess of a dihalogeno aromatic compound corresponding to the formula:

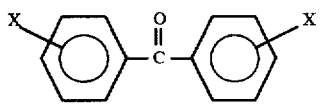

most preferably:

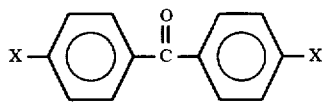

where X is as defined above. This produces a reaction mixture containing unreacted:

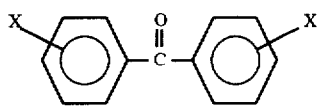

and the end cap monomer:

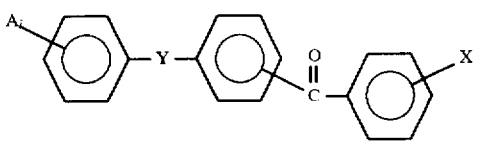

most preferably:

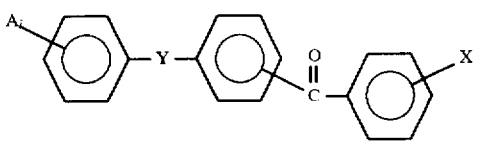

A mixture of sodium hydrosulfide and base may then be added to the reaction mixture, thereby effecting reaction of the dihalogeno aromatic compound, the end cap monomer and alkali metal sulfide. The proportions of sodium hydrosulfide and base added are such as to provide a reactant ratio of n equivalents dihalo aromatic, n+1 equivalents sodium sulfide and 2 equivalents end cap monomer.

The resultant oligomer has the structure:

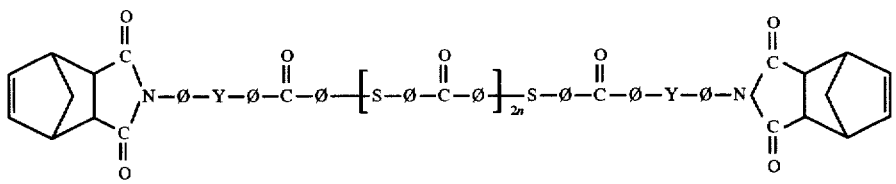

where n=the number of equivalents of dihaloaromatic compound participating in the oligomer formation reaction. An especially preferred structure is that in which Y is sulfide.

Blends suitable for composites can be made, for example, by mixing an oligomer of the invention with a macromolecular or oligomeric polymer that is essentially incapable of crosslinking with the crosslinkable oligomer. Such blends merge the desired properties of crosslinking oligomers and non-crosslinking polymers to provide tough, yet processible, resin blends. A variety of macromolecular or oligomeric polymers may be used, most typically a poly(arylene sulfide) prepared by reaction of a dihaloaromatic compound with a sulfur compound of the type used in the preparation of the oligomer, the reaction being quenched with a suitable non-crosslinking terminal group. Generally, such poly (arylene sulfide)s may be prepared by the methods described in U.S. Pat. Nos. 3,354,129, 3,919,177 and 4,038,261. Most preferably, the non-crosslinking polymer and crosslinkable oligomer are prepared from the same dihaloaromatic and sulfone compound, thus enhancing compatibility between oligomer and polymer. The quenching agent is typically a monohaloaromatic compound such as monochlorobenzene.

Impact resistance of a cured composite can be increased without deleterious loss of solvent resistance by forming a prepreg from a blend of crosslinking oligomers and non-crosslinking macromolecular or oligomeric polymers. Blends of the invention are preferably formed by dissolving the capped oligomer in a suitable first solvent, dissolving the non-crosslinking polymer in a separate portion of the same solvent or in a solvent miscible with the first solvent, mixing the two solutions to form a lacquer, and applying the lacquer to fabric in a conventional prepregging process.

It is preferred that the oligomer and polymer be blended in substantially equivalent proportions, but the exact ratio may be tailored to provide a particular mix of properties for a particular application. Although the polymer in the blend usually has the same length backbone as the cured oligomer, the properties of the composite can also be adjusted by altering the ratio of molecular weights of the oligomer and polymer. The terminal groups of the polymer are not important so long as these groups do not react with or impede the crosslinking of the oligomer end caps.

It is not essential that the oligomer and polymer have identical repeating units, so long as the polymer and oligomer are compatible (i.e. fully soluble or dispersible) in the lacquer prior to sweeping out the blend as a prepreg. Of course, if the polymer and oligomer have identical backbones, compatibility of the blend is more likely to be realized. Poly(arylene sulfide) oligomers may be blended, for example, with poly(phenylene sulfide) or poly (phenylene sulfide ketone) polymers in the manner described in U.S. Pat. No. 4,690,972, which is expressly incorporated herein by reference. While closely similar if not identical structures are preferred, the blends also encompass poly(arylene sulfide) oligomers blended with poly (amide imide)s and poly(aryl sulfone)s as described in U.S. Pat. No. 4,703,081, expressly incorporated herein by reference. Blends may also comprise the various polymers used in the blends described in U.S. Pat. No. 4,595,892, expressly incorporated by reference.

Oligomers and blends of the present invention may be used to form prepregs by the conventional method of impregnating a suitable fabric with a mixture of the oligomer and a solvent. The prepregs may be cured by conventional vacuum bag techniques to crosslink the end caps. As noted above, temperatures suitable for curing are in the range of 480°–640° F. The resulting product is a cured, thermally stable, solvent-resistant composite. Prepregs for composites can also be prepared by interleaving layers of fabric with layers of a film comprising an oligomer or blend, and then subjecting the resultant stack of interleaved materials to heat and pressure sufficient to cause flow of the oligomer into the interstices of the fabric and to crosslink to form a cured polymeric matrix. According to a further alternative, the oligomer may be spun into fibers, and these fibers segmented and commingled with fibers of reinforcing material to produce a prepreg. A composite may be formed from this prepreg in a manner comparable to the method of forming a composite from interleaved oligomer film and fabric layers.

The oligomers can also be used in preparation of fibers, moldings (for example, by injecting molding), adhesives, varnishes, films and coatings. The melt flow characteristics of oligomer are such that it may be used in melt rather than solution form in various applications, including the preparation of composites.

For maximum mechanical properties of coatings or composites prepared from the oligomer or blend, it is preferred that the dihalo substituents of the dihalo aromatic have a predominantly p-orientation. However, for processibility, the most favorable results are generally provided by use of the m- isomer. The m- isomer may also be preferable for adhesives. In certain instances, it may be advantageous to provide a blend of m- and p- isomers having a mix of properties tailored to the particular application of the cured oligomer.

The following example illustrate the invention.

EXAMPLE 1

Nadic anhydride (32.4 g) is reacted with p-chloroaniline (25.5 g) in an organic solvent system. The product p-nadimidochlorobenzene (54.3 g theoretical yield) is recovered by removing the solvent.

EXAMPLE 2

Hydrated $Na_2S$ (48.4 g) in N-methylpyrrolidone (650 ml.) is placed in a glass reaction flask and heated to 160° C. while the flask is flushed with nitrogen for a time sufficient to dehydrate the $Na_2S$. p-Dichlorobenzene (88.2 g) and p-nadimidochlorobenzene (10.9 g) are added to the dehydrated solution, and the resulting mixture is sealed in a glass tube. The mixture contained in the tube is heated at 230° C. for 45 hours, then at 225° C. for 20 hours, and then at 260° C. for 24 hours. A product precipitating from the reaction mixture comprises an oligomer corresponding to the formula:

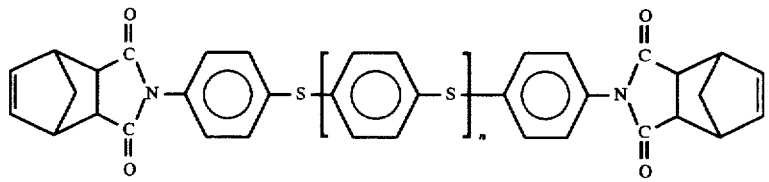

where n=8. Theoretical yield is 71.85.

EXAMPLE 3

A multidimensional oligomer is prepared by reaction of $Na_2S$ (140.4 g), p-dichlorobenzene (176.4 g), 1,3,5-trichlorobenzene (36.3 g) and p-nadimidochlorobenzene (162.9 g). The preparation procedure is substantially as described in Example 1, except that the trichlorobenzene is added together with the p-dichlorobenzene and p-nadimidochlorobenzene. The product precipitating from the reaction mixture corresponds to the formula:

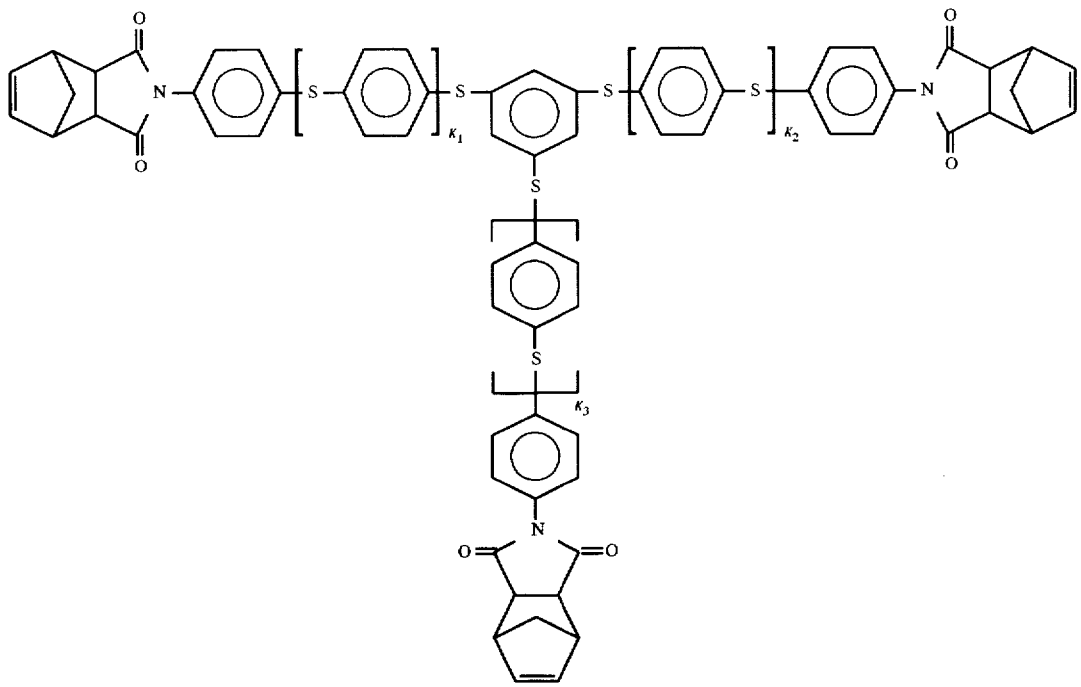

where $k_1$–$k_3$ each average about 2.

EXAMPLE 4 p-Nadimidophenol (10.1 g) is reacted with 4,4'-dichlorobenzophenone (256 g) in N-methylpyrrolidone (1000 ml) to produce a reaction mixture containing 4-nadimidophenoxy-4'-chlorobenzophenone and unreacted 4,4'-dichlorobenzophenone. To this mixture are added sodium hydrosulfide (56 g) and sodium hydroxide (40 g). Subsequent reaction at 225° C. produces an oligomer having the formula:

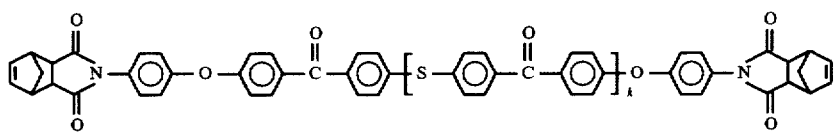

where k averages about 50.

EXAMPLE 5

A 40% by weight solution of the oligomer of Example 1 is prepared in tetrahydrofuran. Epoxy-sized T300/graphite fabric style (Union Carbide 35 million modular fiber 24×24 weave) is impregnated with this oligomer solution to form a prepreg containing 35% by weight resin. The prepreg is allowed to dry under ambient conditions to less than 1 percent volatile content, and is then cut in 6×6 inch pieces and stacked to obtain a consolidated composite of approximately 0.80 inches in thickness. Stacks of such prepregs are vacuum bagged and consolidated under 100 psi in an autoclave heated for a time sufficient to induce cure. Curing is conducted at 625° F. for 1–2 hours. The resultant composites exhibit superior solvent resistance, resistance to delamination, shear strength, thermooxidative and thermomechanical properties.

EXAMPLES 6–8

Using the method generally described in Example 5, prepregs are prepared from the oligomers of Examples 2–4, respectively, and cured to produce composite materials. Like the product of Example 5, these composites exhibit superior solvent resistance, resistance to delamination, shear strength, thermooxidative and thermomechanical properties.

While preferred embodiments are described, those skilled in the art will recognize modifications or variations which might be made without departing from the inventive concept. Therefore, the description and claims should be interpreted liberally with only such limitation as is necessary in view of the pertinent prior art.

What is claimed is:

1. A process for the preparation of a crosslinkable poly (arylene sulfide) oligomer, comprising reacting:

n equivalents of a dihaloaromatic compound;

n+1 equivalents of a sulfur compound that is reactive with halo organic compounds to form thioethers; and 2 equivalents of an end cap monomer corresponding to the formula:

wherein:

X is halogeno;

Ar is arylene;

i is 1 or 2;

19

A is selected from the group consisting of

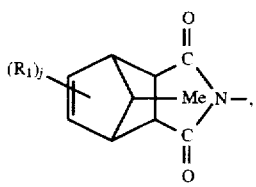

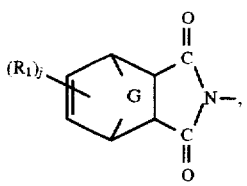

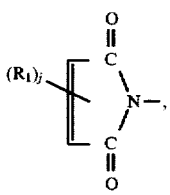

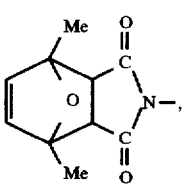

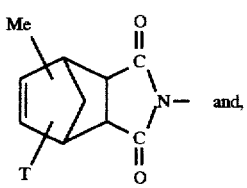

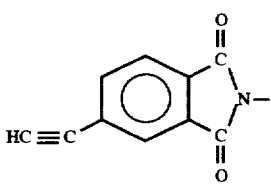

Me is Methyl;

G is —O—, —SO$_2$—, —CH$_2$—, or —S—;

T is allyl or methallyl;

R$_1$ is lower alkoxy, aryl, substituted aryl, lower alkyl, substituted alkyl, aryloxy, or halogen; and j is 0, 1 or 2.

2. A process as set forth in claim 1 wherein said alkali metal sulfide is generated in situ by reaction of an alkali metal hydrosulfide and a base.

3. A process as set forth in claim 2 wherein said end cap monomer corresponds to the formula:

20

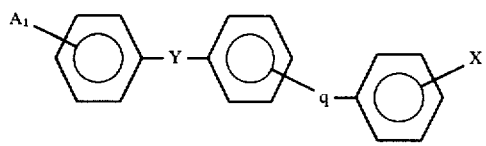

where:

Y is —O— or —S—; and q is selected from the group consisting of —O—, —(C=O)—, —(SO$_2$)—, —S—, —C(CH$_3$)$_2$—, —CH$_2$—, and —C(CF$_3$)$_2$—.

4. A process as set forth in claim 1 in which n is selected to produce an oligomer having a molecular weight of between about 1000 and about 40,000.

5. A process as set forth in claim 1 wherein A comprises:

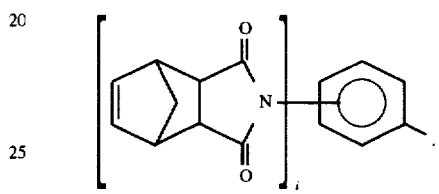

6. A process as set forth in claim 5 wherein i is 2.

7. A process as set forth in claim 1 wherein said dihalogeno compound comprises dichlorobenzene and said end cap monomer corresponds to the formula:

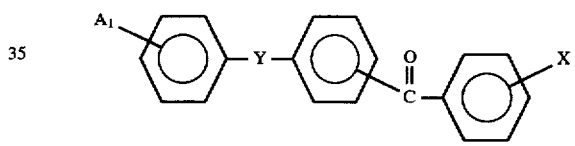

where Y is —O— or —S—.

8. A process as set forth in claim 1 wherein i is 2.

9. A process as set forth in claim 1 wherein the reaction is carried out in the presence of an alkali metal carboxylate and an organic amide.

10. A process as set forth in claim 1 wherein said reaction is carried out in the presence of a cupric or cuprous copper compound.

11. A process as set forth in claim 1 wherein said sulfur compound comprises an alkali metal sulfide.

12. An oligomer prepared by the reaction of:

n equivalents of a dihaloaromatic compound;

n+1 equivalents of a sulfur compound that is reactive with halo organic compounds to form thioethers; and 2 equivalents of an end cap monomer corresponding to the formula:

A$_r$—Ar—X wherein:

X is halogeno;

Ar is arylene;

i is 1 or 2;

A is selected from the group consisting of

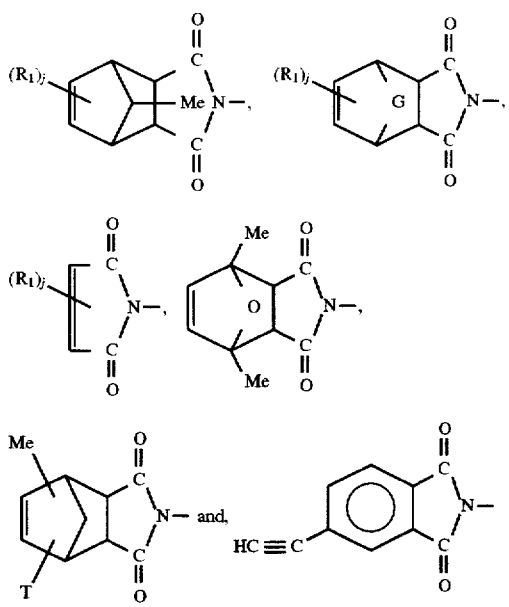

Me is Methyl;

G is —O—, —SO$_2$—, —CH$_2$—, or —S—;

T is allyl or methallyl;

R$_1$ is lower alkoxy, aryl, substituted aryl, lower alkyl, substituted alkyl, aryloxy, or halogen; and j is 0, 1 or 2.

13. An oligomer as set forth in claim 12 having a molecular weight of between about 500 and about 40,000.

14. An oligomer as set forth in claim 12 wherein A comprises:

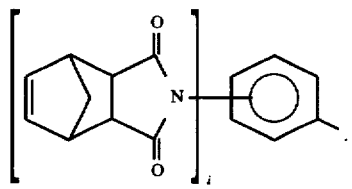

15. An oligomer as set forth in claim 14 wherein i is 2.

16. An oligomer as set forth in claim 14 wherein said dihalogeno aromatic compound comprises p-dihalobenzene.

17. An oligomer as set forth in claim 16 wherein i is 2.

18. An oligomer as set forth in claim 14 having a molecular weight of between about 1,000 and about 40,000.

19. An oligomer as set forth in claim 12 wherein i is 2.

20. A blend comprising a mixture of the oligomer of claim 12 and a compatible non-crosslinking polymer.

21. A prepreg comprising the blend of claim 20 and a reinforcing additive in fiber or particulate form.

22. A prepreg comprising the oligomer of claim 12 and a reinforcing additive in fiber or particulate form.

23. A composite comprising a cured oligomer, the oligomer being that of claim 12.

24. A crosslinkable oligomer corresponding to the formula:

A$_i$—Ar—S$+$Ar$_1$—S$\overline{]_k}$Ar—A$_i$ wherein:

i is 1 or 2;

Ar and Ar$_1$ are arylene;

k is an integer such that the oligomer has a molecular weight of between about 500 and about 40,000;

A is selected from the group consisting of

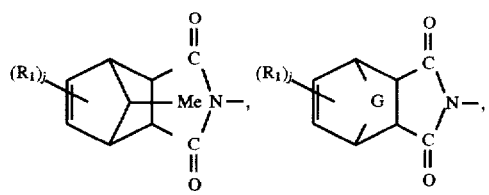

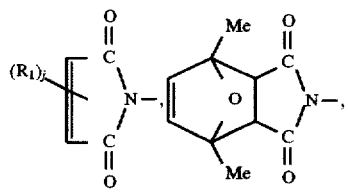

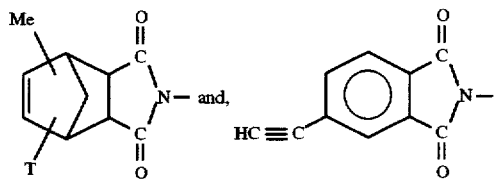

Me is Methyl;

G is —O—, —SO$_2$—, —CH$_2$—, or —S—;

T is allyl or methallyl;

R$_1$ is lower alkoxy, aryl, substituted aryl, lower alkyl, substituted alkyl, aryloxy, or halogen; and j is 0, 1 or 2.

25. An oligomer as set forth in claim 24 wherein

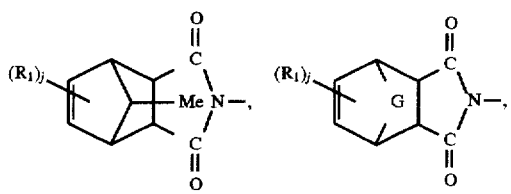

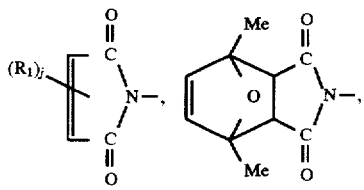

23

[structure: methyl-substituted norbornene imide with T substituent, and ethynyl phthalimide]

k is an integer such that the oligomer has a molecular weight of between about 1000 and about 40,000.

26. An oligomer as set forth in claim 25 wherein i=1 and Ar is phenylene.

27. An oligomer as set forth in claim 25 wherein i=2 and Ar is benzene triyl.

28. An oligomer as set forth in claim 26 or 27 wherein $Ar_1$ comprises p-phenylene.

29. An oligomer as set forth in claim 26 or 27 wherein

—$Ar_1$— comprises p-phenylene or m-phenylene.

30. An oligomer as set forth in claim 25 or 26 wherein $Ar_1$ corresponds to the formula:

[structure: benzophenone-type] and

Ar corresponds to the formula:

[structure: phenyl-Y-phenyl-q-phenyl]

where:

Y is —O— or —S—, and q is selected from the group consisting of —O—, —(C=O)—, —(SO$_2$)—, —S—, —C(CH$_3$)$_2$—, —CH$_2$—, and —C(CF$_3$)$_2$—.

31. An oligomer as set forth in claim 30 wherein $Ar_1$ corresponds to the formula:

[structure: benzophenone] and

Ar corresponds to the formula:

[structure: phenyl-Y-phenyl-C(=O)-phenyl]

32. A multidimensional crosslinkable arylene sulfide oligomer corresponding to the formula:

24

$$Ai-Ar-\!\!+\!\!S-Ar_1\!\!\!+_{k_1}\!\!\!-S-Ar_2-S+Ar_1-S\!\!+_{k_2}\!\!A_r-Ai \text{ or}$$

[branched structure with S, Ar$_1$, Ar$_r$, Ai substituents and k$_3$, k$_1$ subscripts]

$$Ai-Ar-\!\!+\!\!S-Ar_1\!\!\!+_{k_1}\!\!\!-S-Ar_2-S+Ar_1-S\!\!+_{k_2}\!\!A_r-Ai$$

[branched structure with S, Ar$_1$, Ar$_r$, Ai substituents and k$_3$ subscript]

wherein:

Ar and $Ar_1$ are arylene;

$Ar_2$ is a polyvalent aromatic hub moiety;

i is 1 or 2;

$K_1$, $K_2$, $K_3$ and $K_4$ are integers such that the oligomer has a molecular weight between about 2,000 and 40,000;

A is selected from the group consisting of

[structures: (R$_1$)$_j$-substituted methyl-norbornene imide; (R$_1$)$_j$-substituted G-bridged cyclohexene imide; (R$_1$)$_j$-substituted bis-imide with O bridge and Me groups; Me-substituted norbornene imide with T substituent and, ethynyl phthalimide]

Me is Methyl;

G is —O—, —SO$_2$—, —CH$_2$—, or —S—;

T is allyl or methallyl;

$R_1$ is lower alkoxy, aryl, substituted aryl, lower alkyl, substituted alkyl, aryloxy, or halogen; and j is 0, 1 or 2.

33. An oligomer as set forth in claim 32 wherein i=2.

34. An oligomer as set forth in claim 32 wherein i=2 and Ar is benzenetriyl.

35. A blend comprising a mixture of the oligomer of claim 32 and a compatible non-crosslinking polymer.

36. A prepreg comprising the blend of claim 35 and a reinforcing additive in fiber or particulate form.

37. A prepreg comprising the oligomer of claim 32 and a reinforcing additive in fiber or particulate form.

38. A composite comprising a cured oligomer, the oligomer being that of claim 32.

39. A process for the preparation of a crosslinkable poly(arylene sulfide) oligomer, comprising reacting:

n equivalents of a dihaloaromatic compound;

n+1 equivalents of a sulfur compound that is reactive with halo organic compounds to produce thioethers;

m equivalents of a polyhaloaromatic compound having m halo substituents that are reactive with said sulfur compound; and m equivalents of an end cap monomer corresponding to the formula:

$$A_i\text{—Ar—X}$$

wherein:

Ar is arylene;

n≥m;

X is halogeno;

i is 1 or 2;

A is selected from the group consisting of

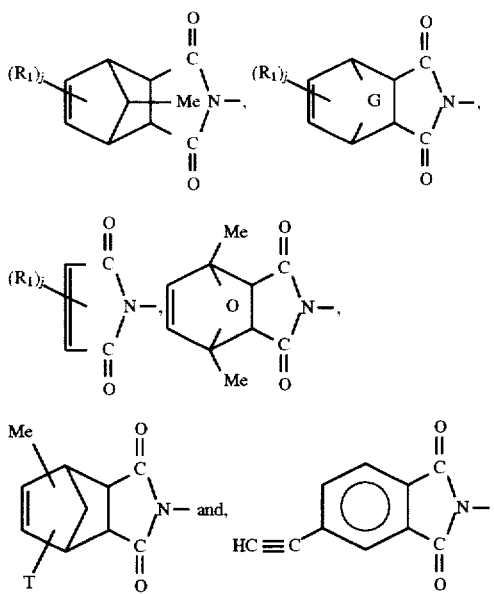

Me is Methyl;

G is —O—, —SO$_2$—, —CH$_2$—, or —S—;

T is allyl or methallyl;

$R_1$ is lower alkoxy, aryl, substituted aryl, lower alkyl, substituted alkyl, aryloxy, or halogen; and j is 0, 1 or 2.

40. A process as set forth in claim 39 wherein i=2.

41. A process as set forth in claim 39 wherein i=2 and Ar is benzenetriyl.

* * * * *